United States Patent [19]

Ibanez

[11] Patent Number: 4,711,422
[45] Date of Patent: Dec. 8, 1987

[54] GOLF CART UMBRELLA MOUNT BRACKET

[76] Inventor: Rene L. Ibanez, 3520 Jermantown Rd., Fairfax, Va. 22030

[21] Appl. No.: 901,637

[22] Filed: Aug. 29, 1986

[51] Int. Cl.$^4$ .............................. F16B 2/06
[52] U.S. Cl. .................... 248/515; 248/535; 248/230; 248/231.6; 248/316.6; 248/229
[58] Field of Search .............. 248/515, 514, 516, 534, 248/535, 540, 541, 230, 231.6, 316.6, 62, 74.1, 74.4, 229; 403/362, 347, 385

[56] References Cited

U.S. PATENT DOCUMENTS

| | | | |
|---|---|---|---|
| 336,363 | 2/1886 | Ward | 248/515 |
| 591,423 | 10/1897 | Poekert | 248/580 |
| 1,364,053 | 12/1920 | Quintin | 248/229 |
| 1,393,158 | 10/1921 | Pawsat | 248/229 |
| 2,822,143 | 2/1958 | Johansen | 248/514 |
| 3,148,851 | 9/1964 | Condon | 248/229 |
| 3,304,035 | 2/1967 | Davis | 248/514 |
| 3,304,036 | 2/1967 | Davis | 248/229 |
| 4,190,224 | 2/1980 | LeBlanc | 248/229 |
| 4,544,120 | 10/1985 | Lowell | 248/230 |

FOREIGN PATENT DOCUMENTS 1014608 8/1957 Fed. Rep. of Germany ...... 248/229
2042056 9/1980 United Kingdom ................ 248/287

Primary Examiner—Reinaldo P. Machado
Assistant Examiner—Alvin Chin-Shue

[57] ABSTRACT

The present disclosure is directed for use with a static part of a golf vehicle and has a first and second pair of clamping elements for attaching the handle of an umbrella to the golf vehicle. Each of said clamping elements has a pair of clamp jaws at one end and a block having a bore and locking screw at the other end. The clamping elements are joined by a spacer rod having positioning arms extending off each end in opposite directions, each positioning arm being receivable through a bore at one end of each of the clamping elements so that the spacer rods are engaged by locking screws or bolts carried by one of said clamping elements for angular adjustment of the spacer rod relative to each other for adjustably positioning the umbrella carried by said first clamping element relative to the desired part of the golf vehicle to which said second clamping element is secured.

2 Claims, 5 Drawing Figures

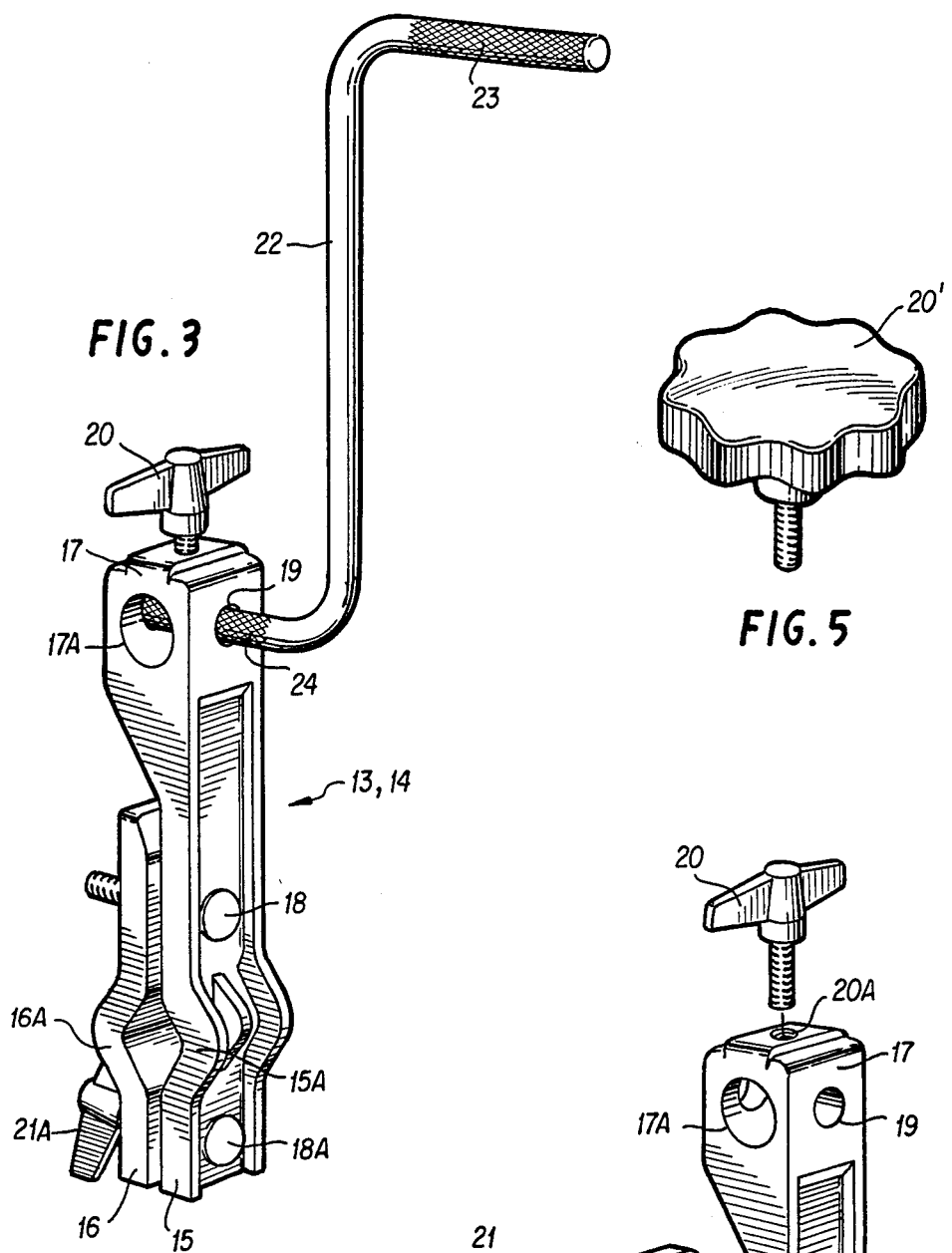
FIG. 3
FIG. 5
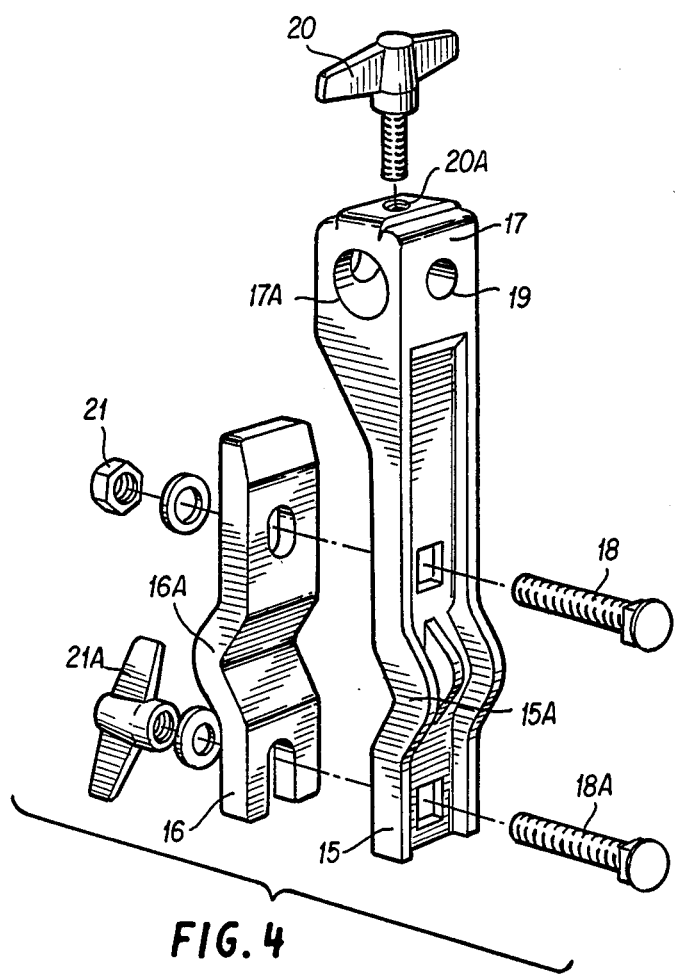
FIG. 4

GOLF CART UMBRELLA MOUNT BRACKET

BACKGROUND OF THE INVENTION

The present invention is directed to a portable quick attaching device for securing an umbrella to a golf cart or vehicle which device may be quickly attached or removed from the vehicle such as a golf bag cart so that the bag and cart may be transported in the trunk of a vehicle or may be removed from a pull bag cart and attached to the steering column of a ride around golf cart.

BACKGROUND ART

The best art known to me at the filing of this application is U.S. Pat. No. 3,304,035 to C. R. Davis and U.S. Pat. No. 2,822,143 to M. C. Johansen.

SUMMARY OF THE INVENTION

The present invention is directed to two clamping elements which may be removably secured at one end to a tubular or cylindrical support such as a draft handle of a pull around golf cart or the steering column of a ride around golf cart. The clamping elements at their other end is provided with a bore opening at a right angle to the clamping portion of the device for passage therethrough of a spacer rod having two connector ends extending off the spacer rod at its top and bottom ends at 90° thereto and in opposite directions. The end of the clamping element having the bore opening also has a closed end having a threaded bore opening for receiving a T-headed threaded securing screw passing through the threaded opening for tightening the T-headed screw end against one of the two connector ends of the spacer rod.

A similar clamping element to that described above is secured to the upper connector end extending off the spacer rod at its top and is secured thereto by a T-headed threaded securing screw and the clamping elements of the upper clamping device may be removably secured about the handle of an umbrella.

BRIEF DESCRIPTION OF THE DRAWINGS

FIG. 3 is a perspective view of one of the clamping elements of the present invention having the spacer rod secured thereto.

FIG. 4 is an exploded perspective view of the clamping element of FIG. 3.

FIG. 5 is a perspective view of the fluted round threaded locking bolt.

DESCRIPTION OF THE BEST MODE OF CARRYING OUT THE INVENTION

Figure 1:
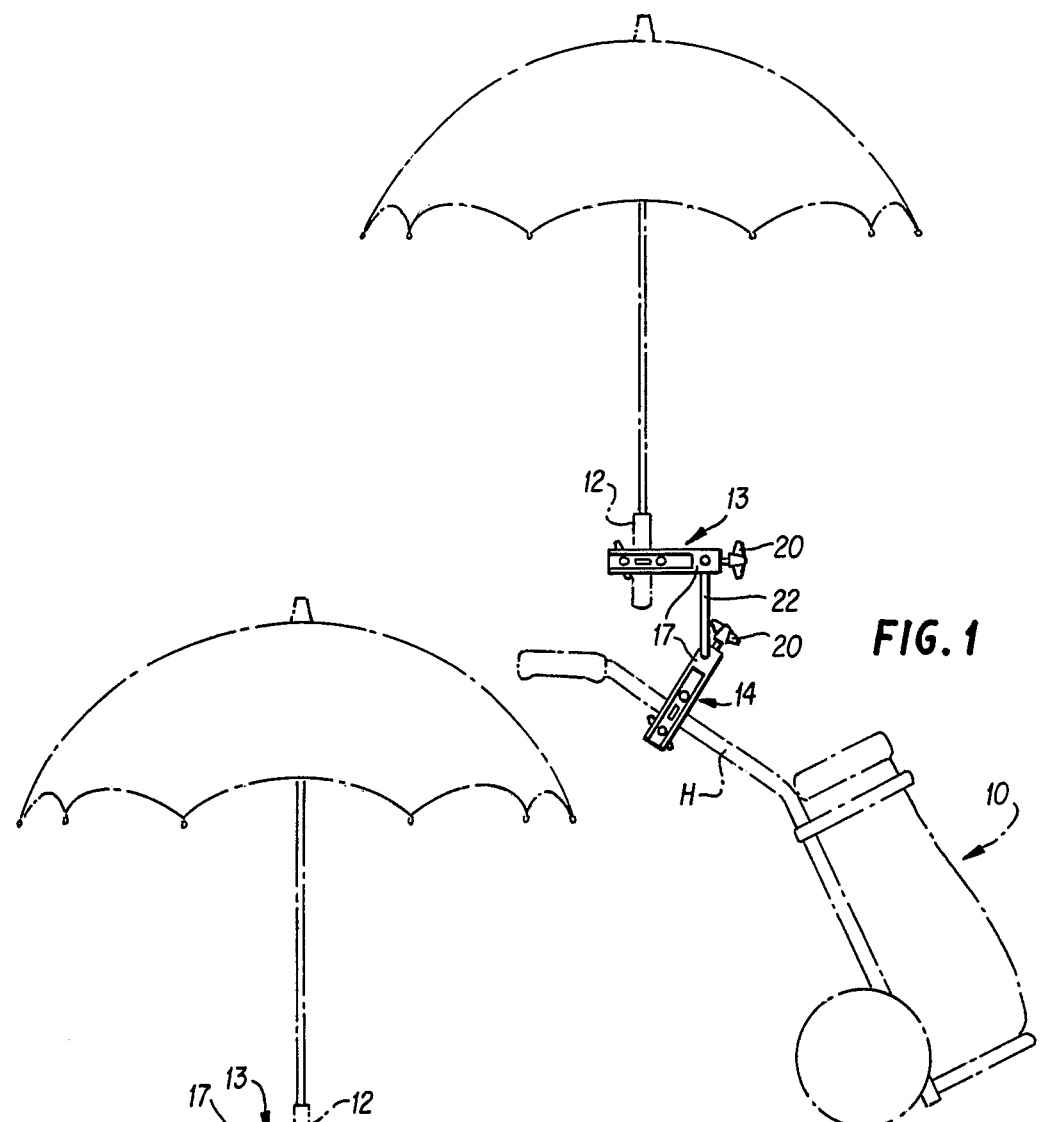
FIG. 1 is a schematic side elevational view of a pull around cart for a golf bag and clubs having an umbrella mounted thereon employing the clamping elements and spacer rod of the present invention.

Referring now to the drawings and for the moment to FIGS. 1, 2, and 3, 10 designates a golf club carrying vehicle in the form of a pull around cart for a golf bag and clubs and a ride around cart 11 for carrying both clubs and golfers both in a manner well known to the art. The purpose of the present invention is to attach an umbrella handle 12 to either the manually pulled cart or the larger self-propelled club and golfer transporter 11.

Figure 2:
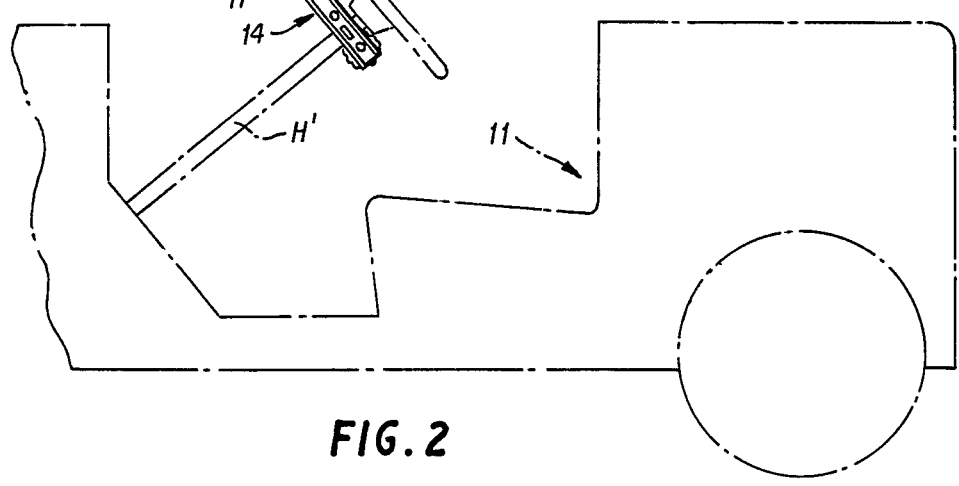
FIG. 2 is a schematic side elevational view of a ride around golf cart for golf bags and golfers having an umbrella mounted on the steering column employing the clamping elements and spacer rod of the present invention mounted thereon.

Two identical clamping elements 13 and 14, best seen in FIGS. 1 and 2 are employed. As best seen in FIGS. 3 and 4 each clamping element has a pair of clamp jaws 15, 16 at one end and a bore block 24 having two right angle bores 18, 19 therethrough and a threaded T-headed bolt 20 at the other end.

The clamping jaws 15, 16 as shown in FIGS. 3 and 4 have complementally dished portions 15A, 16A to pass about either the pull handle H of the cart 10 or the steering column H' of the ride around cart 11. The two jaws 15, 16 have attaching bolts 18, 18A and nuts 20 and 21 to permit their attachment about or removal from the handle H or steering column H'.

Referring now to FIGS. 1, 2 and 3, a spacer rod 22 spaces the two clamping elements 13 and 14 from each other and has positioning arms 23 and 24 extending off opposite ends of the rod 22 which pass through the selected bores in the block 17.

At the opposite end of each clamping element, best seen in FIGS. 1 and 2, remote from the clamp jaws 15, 16 are positioning blocks 17, 17 each having right angle bores 18, 19 therethrough to receive the positioning arms 23, 24 through a selected bore for being locked in place by T-headed bolt 20 or fluted round threaded locking bolt 20' passing through threaded bore 20A and locking against arms 23, 24. Arms 23, 24 have their external surfaces knurled to effect a firmer gripping action between the positioning arms 23, 24 locking bolts 20 or 20' and the blocks 17.

One clamping element 13 grips either the pull handle H of cart 10 or the steering column H' of the ride around cart 11 while the other clamping element 14 clamps about the handle 12 of the umbrella to permit adjustment of the umbrella to provide either sun or rain protection to the golfer using either form of cart.

What I claim is:

1. For use with a vehicle having a rounded frame part to which an umbrella may be adjustably secured, a first and a second pair of clamping elements for attaching the handle of an umbrella to the vehicle, each of said clamping elements having a pair of lockable clamp jaws at one end with complementary dished portions and bolt means on both sides of said portions for grasping one of said umbrella and vehicle frame part and a block having two bores at right angles to each other at the other end of one of said separable clamp jaws of each clamping elements, locking screws threadedly received through said block and positioned to pass through said bores, a spacer rod having positioning arms extending off each end of said spacer rod in opposite directions at an angle directed away from the axis of said spacer rod, each positioning arm being receivable through the bore in the block of each of said first and second pair of clamping elements remote from said clamp jaws, said spacer rod positioning arms being cylindrical in cross-section to pass through the bore in the end of said clamping elements remote from said clamp jaws and one wall of said bore threadedly receiving a locking bolt to lock said positioning arms in place relative to their attaching clamps, said positioning arms passing through the bore in said blocks to be engaged by and locked with the locking screw passing through each said block to permit universal positioning of the umbrella relative to the point of attachment to said vehicle.

2. Umbrella and vehicle attaching clamps as claimed in claim 1, wherein said spacer rod and positioning arms are cylindrical in cross-section to pass through the bore in the end of said clamping elements remote from said clamp jaws, one wall of said bore having a threaded opening to receive a threaded T-shaped locking bolt to lock said positioning arms in place relative to said attaching clamps.

* * * * *